H. W. COLLENDER.
Billiard-Table.
No. 6,469. Reissued June 1, 1875.
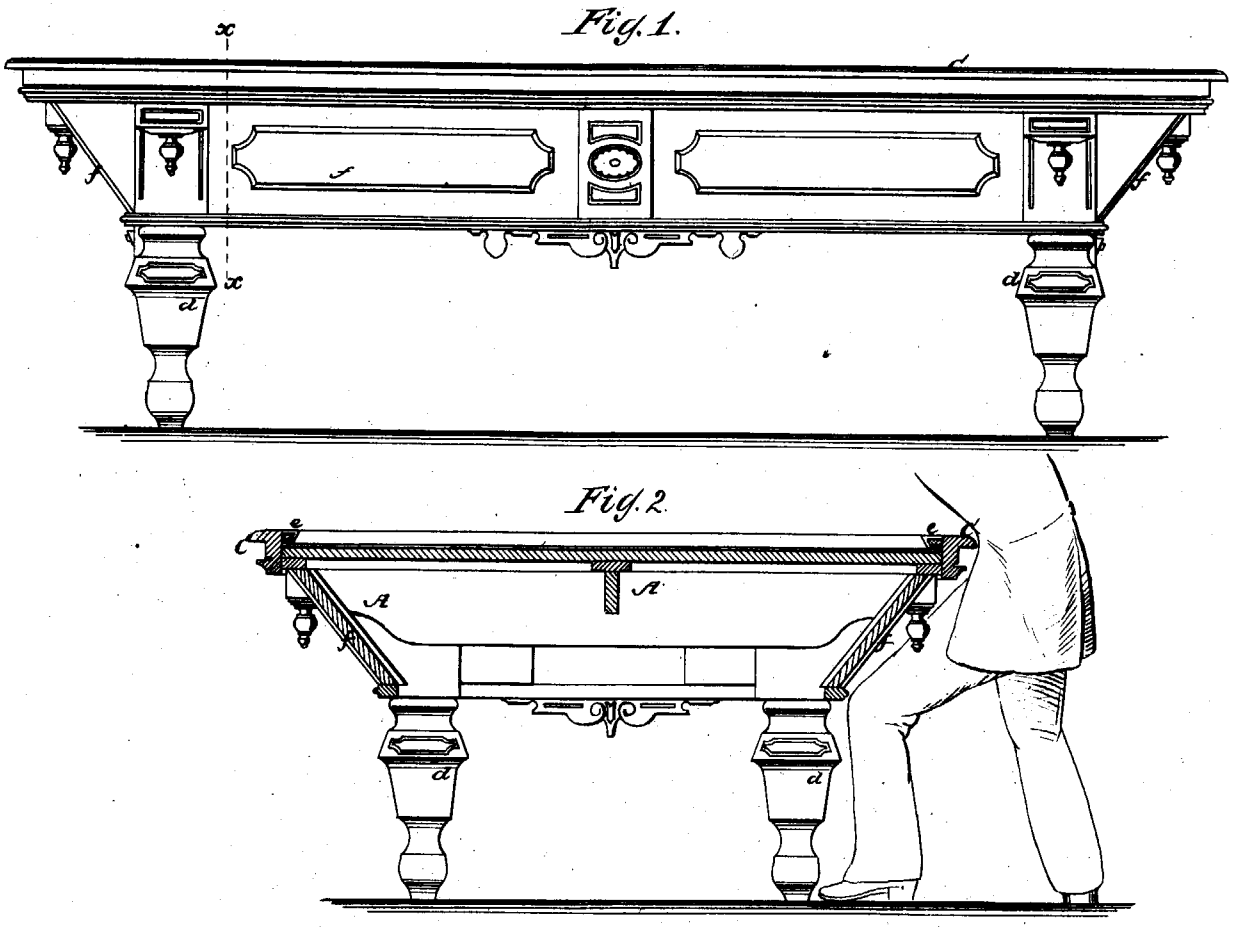
Witnesses:
Frank Fun Dieu
Jacob Pilbel
Inventor:
Hugh W. Collender
By his attorney
J. McCulloch
THE GRAPHIC CO. PHOTO-LITH. 39 & 41 PARK PLACE, N.Y.

UNITED STATES PATENT OFFICE.

HUGH W. COLLENDER, OF NEW YORK, N. Y.

IMPROVEMENT IN BILLIARD-TABLES.

Specification forming part of Letters Patent No. 145,787, dated December 23, 1873; reissue No. 6,469, dated June 1, 1875; application filed May 20, 1875.

*To all whom it may concern:*

Be it known that I, HUGH W. COLLENDER, of New York, of New York county, in the State of New York, have invented certain new and useful Improvements in Billiard-Tables; and I do hereby declare that the following is a full and exact description thereof, reference being had to the accompanying drawings, making part of this specification.

Previous to my invention it has been customary, in the construction of billiard-tables, to form the body of the table with vertical sides, extending downward from lines a short distance within the outer edges of the cushion-rails, or with what are generally designated as straight or vertical side rails; and previous to my invention nearly all billiard-tables manufactured and used in this country have been made according to this plan.

A great variety of designs in the finish and ornamentation and in the shape of the legs have been devised and carried into use, and many and great improvements in the past few years have been made in the construction of the beds, cushions, and details of the table, for which numerous patents have been granted to me and to other billiard-table makers, until nearly all the requisites of a perfectly-working and unique apparatus or machine appeared to have been attained; but one serious inconvenience and disadvantage still remained in the shape of the body of the table. It was necessary on account of the weight of the bed, and to provide for a sure and lasting support of the same, to have the side rails, or the body of the table, of considerable depth, and their arrangement in vertical planes, extending downward the requisite distance, has proved a source of great disadvantage to the player in preventing him from assuming a position with his leg nearest the table, by which he might be enabled to place and conveniently hold his bridge hand as far over on the bed-table, or as far away from the cushion, as possible in the execution of shots in which the cue-ball rests far from the cushions, and thus avoid the use of the bridge, which to most players is objectionable, and which it is of great advantage to dispense with as much as possible.

It has also been customary previous to my invention to make billiard-tables with the sides of the body run under, somewhat after the fashion of what are known as "French" tables or "ogee" tables; but in all this kind of tables the sides or broad rails have been so formed and so arranged relatively to the extreme upper edge of the table, or to the edge of cushion-rail, that the lower part of the sides, or that portion likely to be on a level with the bended knee of the player, obstructed the advanced leg of the player, besides which objection the legs of the table were not placed far enough under to be always entirely out of the way of the player's feet, and the curved or ogee form of the sides rendered the manufacture of such tables very expensive.

My invention has for its object to overcome all these objectionable features in the structure and form of the table, and to provide a billiard-table which, while it shall be equally as strong and durable in construction as either of the kinds heretofore made, and equally as desirable in all other respects, shall embody the great advantage of having its broad rails (or the lower portions of its sides) and feet so located as to be always entirely out of the way of the legs and feet of the player, and so as to permit the player to place his bended knee as far under the cushion-rail and table-bed as may be necessary to effect the placement of his bridge hand as far as possible from the cushion, and at the same time properly support his center of gravity, or maintain his equilibrium; and to these ends and objects my invention consists in a billiard-table in which the broad rails are so beveled or inclined under, and so arranged with, the cushion-rails (or edge of the table) and the table-bed that, while the latter shall be properly supported, the broad rails shall be always out of the way of the player's bended knee, as will be hereinafter more fully explained.

To enable those skilled in the art to make and use my invention, I will more fully explain the construction and operation thereof, referring by letters to the accompanying drawings, in which—

Figure 1 is a side elevation, and Fig. 2 a vertical cross-section, of a billiard-table made according to my invention.

The bed B, the cushion-rails C, with their attached cushions *e*, and the legs *a*, which support the body of the table, are all made in about the usual most approved manner; but the side rails *f*, or sides of the body of the table, are made and arranged, as seen, in an oblique, in lieu of the usual vertical or nearly vertical, position, their upper edges being located as far under the table and away from the cushion-rails as they can be placed, and afford a proper support to the edges of the slabs composing the bed.

The figure represented by the body thus formed is that of an inverted frustum of a pyramid, instead of being about rectangular in its appearance, as in most of the tables heretofore made. The sides *f* should be beveled or inclined inward, as they descend from the cushion-rails or under side of the bed, at about an angle of from thirty to forty degrees, or quite sufficiently to permit the player to place his leg in the proper position for reaching as far as possible with the bridge hand, but no farther than is necessary for this purpose, because if the angle or flare be increased the structure is proportionally weakened, the capacity of the body or frame to sustain vertical strain being lessened as such inverted frustuminal frame is flattened out.

At Fig. 2 I have illustrated part of a player's figure to show the convenient and advantageous position which the player may assume in playing, and which position it would be utterly impossible to assume were the sides *f* extended down in the usual manner, about vertically.

It will be seen that the beveling of the sides or broad rails of the table, as shown and described, permits the player to so extend his bended knee under the table, and so place his foot and posture himself, as to maintain his equilibrium perfectly while reaching over the table to make his bridge, and that the arrangement of the beveled sides with the bed and cushion-rails, as shown and described, renders the support of the bed as perfect, and the whole structure as durable, as in tables made with the old-fashioned vertical broad rails.

Any one skilled in the art appreciates the importance of affording the best possible support to the bed throughout the whole extent of the plane of the table, so that it will not get out of level.

It will also be seen that while in a table made according to my invention the body will be equally as strong as, if not stronger (with the same amount of material) than, a table made the old way, by the convergence of the sides *f*, as they descend, the legs *d* are brought farther under the table, and more out of the way of the player's feet.

The construction of such a table as herein shown and described is no more expensive than one with the vertical sides, and may be ornamented and elaborated to the same extent that other tables can be, while at the same time the inclination or obliquity given to the sides, and the consequent location of the legs farther under the table, give to the whole machine or contrivance a lighter and more beautiful appearance.

It will be understood that the angle of inclination of the sides *f* may be varied somewhat from the position or inclination shown without departing from the spirit of my invention, the gist of which rest in the idea of having the planes of the broad rails *f* so inclined or beveled under as to permit the placement of the player's leg and foot as I have explained, and so combined and arranged with the bed and cushion-rails of the table as to afford the most effectual and permanent support of the bed by the said broad rails.

I am aware, as I have already remarked, that previous to my invention what are commonly known as French tables have been made and used; but my invention should not be confounded with any such construction of table, which differs materially from my improved billiard-table in these essential and material particulars—among others, viz: first, in the French (or ogee) tables the sides of the body, or those parts corresponding to what are called in American tables the broad rails, were so combined and arranged with the cushion-rail and bed that the lower portions of the body (that part on about a level with the bended knee of the player) were not located any farther under the table and out of the way of the player than were the lower portions of the bodies of the old-fashioned vertical-sided (American) tables; second, in the French tables the curved form, or the ogee shape, of the body rendered the cost of the construction so great that the manufacture of such table could not compete with the manufacture of either of the plane vertical-sided tables or my improved bevel tables.

Having thus fully explained the construction and advantages in use of my improved billiard-table, what I claim therein as new, and desire to secure by Letters Patent, is—

In combination with the bed and projecting cushion-rails, the beveled sides or broad rails *f*, the whole constructed and arranged substantially in the manner and for the purposes described.

In testimony whereof I have hereunto set my hand and seal this 27th day of April, 1875.

H. W. COLLENDER. [L. S.]

In presence of—
J. N. McINTIRE,
JACOB FELBEL.